July 23, 1940. A. WIDUCH 2,208,654
DEVICE FOR CUTTING, SHREDDING, AND GRATING VEGETABLES
Filed April 13, 1938
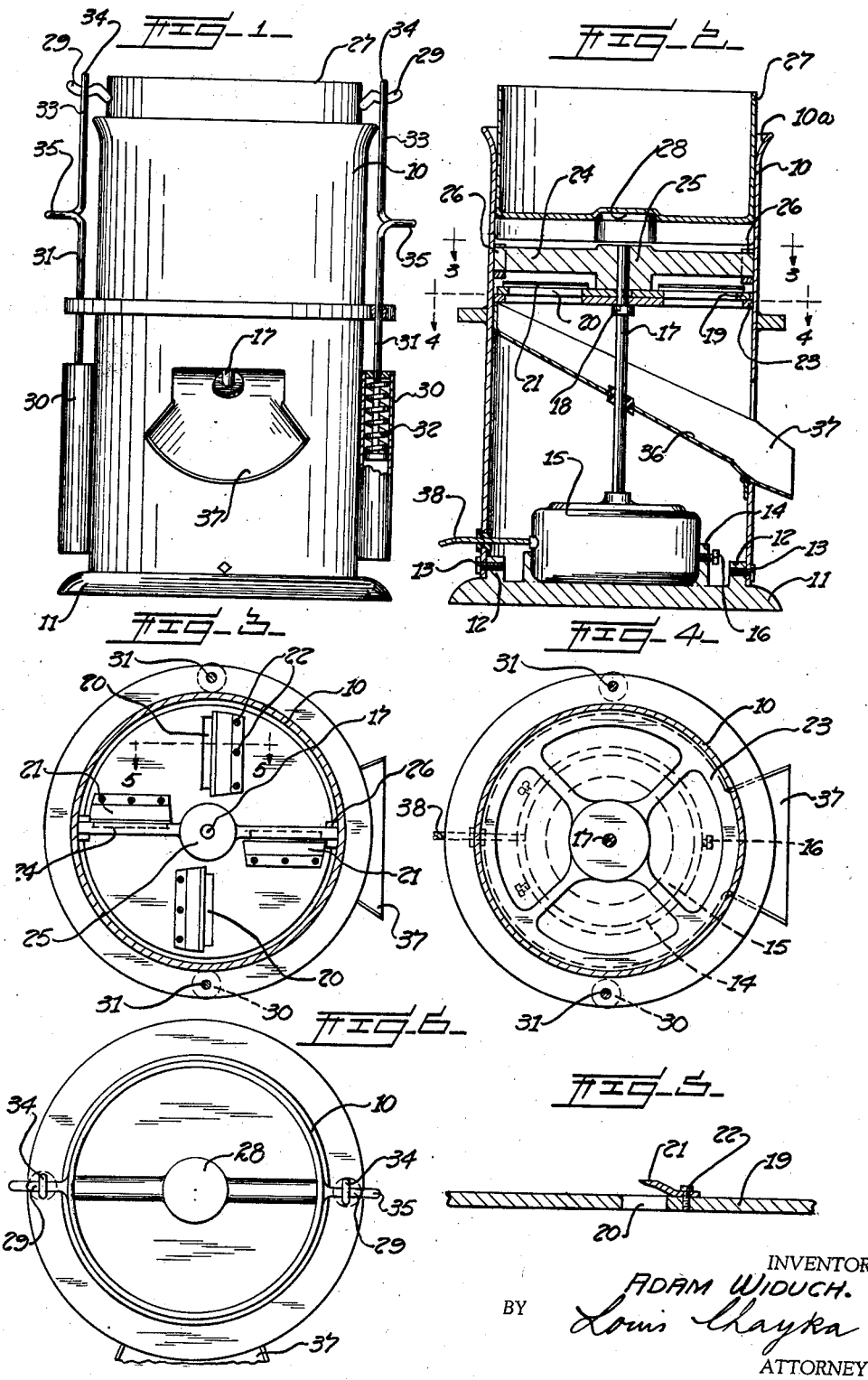
INVENTOR.
ADAM WIDUCH.
BY Louis Chayka
ATTORNEY.

Patented July 23, 1940

2,208,654

UNITED STATES PATENT OFFICE 2,208,654

DEVICE FOR CUTTING, SHREDDING, AND GRATING VEGETABLES

Adam Widuch, Michigan City, Ind., assignor of one-half to Walenty Sliwa, Michigan City, Ind.

Application April 13, 1938, Serial No. 201,780

1 Claim. (Cl. 146—125)

The purpose of my invention is to provide an appliance simple in construction, attractive in design and efficient in use and particularly adapted for household use.

While cutters for vegetables have already been made before, the appliance invented by me embodies certain new and useful features which will be readily appreciated by reference to my description of same which follows and to the accompanying drawing, in which:

Fig. 1 shows a side elevation of my vegetable cutter.

Fig. 2 shows a vertical sectional view thereof.

Fig. 3 shows a sectional view on line 3—3 of Fig. 2.

Fig. 4 shows a sectional view of my cutter taken on line 4—4 of Fig. 3.

Fig. 5 shows a detailed sectional view of a rotary disc taken on line 5—5 of Fig. 3.

Fig. 6 shows a plan view of my cutter.

Similar numerals refer to similar parts throughout the several views.

The cutter of my design is round in shape, comprising a cylindrical container 10 resting on base 11. Said base may be made of cast iron or other substance and is provided with lugs 12, to which the lower portion of the cylinder 10 may be attached by screws or bolts 13. An annular flange 14, disposed centrally on said base and being integral therewith, provides a seat for electric motor 15. Screws 16, threaded through said flange 14, aid in securing the motor firmly to its seat. This provision is obviously optional as any other means of securing the motor to the base may be provided. Rising from the motor 15 upwardly is shaft 17, being the shaft of the rotary element of the motor, and is provided at its upper end with a shoulder 18. Seated upon said shoulder and suitably keyed to shaft 17 is a rigid metal disc 19 provided with radially struck out apertures 20, over which knives 21, also disposed radially, are affixed by means of screws 22. This is shown in Fig. 5. The cutting edges of said knives 21 are inclined upwardly, being at an angle to the level of the disc 19. The latter, being keyed to the shaft, as above set forth, rotates with said shaft. If desired, said disc may be removed at will from said shaft and another disc adapted for grating or a similar operation may be substituted in its place.

An annular projection 23, from the inside wall 10 and disposed under the periphery of the disc 19, serves to prevent said disc from being swung downward under the pressure exerted upon the disc from above, as will be described hereinafter. Said disc 19 is, however, slightly raised over the projection 23 so as to avoid friction therewith.

A plate 24, provided at a point intermediate its ends with a boss 25 to accommodate the end of the shaft 17, extends diametrically across the disc 19 but slightly above its surface so as not to interfere with the motion thereof, and is held at its ends in grooved lugs 26. Said lugs are affixed to the wall of the container 10. The plate serves to prevent the vegetables delivered into my appliance for cutting from being carried around on the rotating disc 19. Said plate is inserted over the end of shaft 17 and into the grooved lugs 26 in such a manner that it may be readily removed when desired.

The space in the container above the rotating disc is intended to accommodate and to receive vegetables selected for cutting or shredding. To obtain best results, it is necessary that some pressure be applied from the top upon vegetables, as otherwise the knives of the cutter might only effect a sliding contact with said vegetables. To overcome this deficiency, I have provided means of exerting steady pressure upon said vegetables until all of them have been disposed of by the cutting means on disc 19. The means in question consist of a potlike structure 27, which I call a loader, fitting into the receiving end 10a of my appliance. The bottom of said loader 27 is provided with a transverse recess 28, so as to fit the plate 24 and boss 25. At its upper end, said loader 27 is provided with ears 29 situated at diametrically opposed ends on the rim of said loader. Two cylinders 30 are affixed to the outside surface of the lower part of the container 10 on the opposite sides thereof. Partly contained therein is a rod 31, the lower ends thereof remaining under the tension of a coiled spring 32 extending within cylinder 30, while the upper end 33 of said rod is provided with a loop 34 adapted to be slid over ear 29. Intermediate the ends of said rod is another horizontal loop 35 serving as an aid in handling said rod.

Expanding below the cutting disc and set at an angle to said disc is a delivery apron 36 ending in a delivery chute 37. 38 indicates a cable conducting current to motor 15.

In operation, vegetables to be cut or shredded are loaded into the receiving end or hopper 10a of the device, whereupon loader 27 is inserted into said hopper over the vegetables, and loops 34 of the rod 31 are placed over ears 29. Tension of spring 32 is thus transmitted to the loader, which transfers same in the form of pressure downward upon vegetables in the hopper. Then, when the motor is started and the disc begins to rotate, said vegetables are wedged against plate 24 and pressed down by loader 27 into the path of knives 21. Vegetables cut or shredded by said knives fall through openings 20 into the apron 36 and slide out through the chute 37.

It will be seen from the above description that while the principle of the construction of the cutting section of my device was already known, my improvement refers principally both to the shape of my appliance and to the loading mechanism therein. It is by virtue of this loading mechanism that vegetables in my device are under a steady pressure until the cutting process has been fully completed. The improvement is novel and very useful as it eliminates personal attention of persons using the appliance. I realize that changes may be made in my said construction without departing from the spirit of my invention.

What I, therefore, claim is:

A vegetable slicer comprising a casing open at its top, a base for said casing, a spider carried by the walls of said casing intermediate the height thereof, a motor supported upon said base within the casing, a shaft extending upwardly from said motor through the spider, a vegetable supporting disc carried by said shaft to turn therewith and resting upon said spider, said disc being formed with openings, radially extending blades carried by said disc along said openings and extending at an upward incline over the openings, sockets carried by the walls of the casing, a bar extending transversely in said casing and supported in said sockets and provided with a bearing rotatably receiving the upper end of the shaft, said bar constituting means for preventing vegetables from moving with the disc, a follower slidable vertically in the upper portion of said casing, ears extending from follower, cylinders carried by said casing, vertical rods having their upper ends detachably engaging said ears and their lower portions slidable in the cylinders, springs in the cylinders for urging the rods and the follower downwardly, and an apron in the casing under the spider having a chute projecting out of the casing.

ADAM WIDUCH.